US008140806B2

(12) United States Patent
Vingralek et al.

(10) Patent No.: US 8,140,806 B2
(45) Date of Patent: Mar. 20, 2012

(54) ELIMINATING FRAGMENTATION WITH BUDDY-TREE ALLOCATION

(75) Inventors: Radek Vingralek, Belmont, CA (US); William H. Bridge, Jr., Alameda, CA (US); Prasad Bagal, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1390 days.

(21) Appl. No.: 11/694,445

(22) Filed: Mar. 30, 2007

(65) Prior Publication Data

US 2008/0244210 A1  Oct. 2, 2008

(51) Int. Cl.
    *G06F 12/00* (2006.01)
(52) U.S. Cl. .................................. 711/170; 711/E12.07
(58) Field of Classification Search .................. 711/170
    See application file for complete search history.

(56) References Cited

U.S. PATENT DOCUMENTS

| 2004/0221120 | A1* | 11/2004 | Abrashkevich et al. ....... 711/170 |
| 2007/0288692 | A1* | 12/2007 | Bruce et al. .................... 711/113 |
| 2008/0104353 | A1* | 5/2008 | Madisetti ....................... 711/170 |

OTHER PUBLICATIONS

Donald E. Knuth, *The Art of Computer Programming*, Addison-Wesley Publishing Company, Inc., Reading, Massachusetts, vol. 1, 1969, pp. 442-445, 448-450, 453, 454, 460 and 605.

* cited by examiner

*Primary Examiner* — Reginald Bragdon
*Assistant Examiner* — Hamdy S Ahmed
(74) *Attorney, Agent, or Firm* — Kilpatrick Townsend & Stockton LLP (57) ABSTRACT

This disclosure describes solutions for reducing the amount of fragmentation on a computer memory device, such as a hard disk, random access memory device, and/or the like. In an aspect, this disclosure describes systems, methods and software for allocating storage space for variable-sized data chunks in a fashion that reduces or eliminates the need for periodic de-fragmentation of the memory device. In another aspect, this disclosure describes solutions that provide for the dynamic re-allocation of existing data blocks on the memory device to provide contiguous available space that can be allocated for new data blocks.

14 Claims, 7 Drawing Sheets

ELIMINATING FRAGMENTATION WITH BUDDY-TREE ALLOCATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to data storage devices, and more particularly to methods, systems and software for allocating data on such data storage devices.

BACKGROUND OF THE INVENTION

For a variety of reasons, persistent storage devices (such as hard disk drives, to name one example), are designed to store data in "allocation units," which represent the smallest-sized block of storage that can be set aside to store a particular data chunk. Allocation units range in size depending, often, on both hardware and software configuration. Thus, even if a given data chunk is smaller than the allocation unit, an entire allocation unit is allocated to hold the data. Similarly, if the data chunk is larger than a single allocation unit, two (or more, as appropriate) allocation units will be allocated to hold the data chunk.

In most cases, it is desirable (or required) that all of the data for a particular data chunk is stored in close physical proximity on the storage device (for example, drive performance in reading the data set generally will be better if the drive does not have to read the data from several, physically separate locations). Indeed, in many cases, the storage of a particular data set will require sufficient contiguous space to store the entire data set. Those skilled in the art will appreciate, however, that the nature of persistent storage devices, and how they are typically used, often leads to a situation known as "fragmentation," in which available allocation units become scattered (or fragmented) across the storage medium, as a result of iteratively writing and deleting data sets of varying sizes. In some cases, this fragmentation, in fact, can lead to a situation in which, although there is plentiful aggregate free space on the storage device, there is insufficient contiguous free space to store a particular data set. Hence, fragmentation can result in the underutilization of the storage device.

Most systems deal with fragmentation by either allocating only fixed-sized pages (when it is not essential that the allocated space is contiguous) or by periodically running a wholesale compaction (often referred to as de-fragmentation). Neither of these solutions is ideal, however. As above, in many applications, allocated space must be contiguous, such that fixed-sized pages are infeasible. Further, a wholesale de-fragmentation operation generally is quite costly from a resource utilization perspective and often requires the device to be effectively out of service while the operation completes. In many environments (such as high-performance and high-availability environments), the costs of wholesale de-fragmentation may be prohibitive.

BRIEF SUMMARY OF THE INVENTION

In a set of embodiments, the invention provides solutions to reduce and/or eliminate fragmentation on a data storage device (such as a hard drive, drive array, RAM device, and/or the like) through an improved process for allocating space for new data sets. In various aspects, these solutions address the problems above, as well as other issues not described herein.

In an aspect, some embodiments avoid the cost of wholesale de-fragmentation by performing it on-demand. In other words, when allocating contiguous space for a data chunk, the allocation algorithm may need to relocate one or more other data chunks.

As used herein, the term "data chunk" means any set of data (of whatever size) that needs to be stored contiguously. Correspondingly, the term "allocation unit" means the smallest set of storage space into which a storage medium can be divided. Hence, in a set of embodiments, an allocation algorithm receives, as input, a request to allocate storage space for a data chunk, and produces, as output, a contiguous set of allocation units sufficient to store that data chunk (or, in some cases, references to that contiguous set of allocation units).

In a particular embodiment, the use of a Buddy-Tree algorithm to allocate sets of allocation units for storing a particular data chunk ensures that any relocated data chunks are smaller than the than that particular data chunk, thus limiting the cost of relocation. These and other aspects provide for more effective allocation of allocation units that, over time, produces less data fragmentation on the media than traditional allocation methods, reducing or eliminating the need to perform periodic, wholesale de-fragmentation of the device.

Various embodiments of the invention provide, inter alia, methods, systems and software products. In some embodiments of the invention, a system (such as a computer system) might be configured to implement a method of the invention. Merely by way of example, the system might comprise, inter alia, one or more processors, along with instructions (which might be stored on a disk and/or other computer readable medium) executable by the processors to perform the method. In other embodiments, a software product might embody the method, for example as a set of instructions (which again, might be stored on a disk and/or other computer readable medium), which are executable by one or more computers to execute the method.

Merely by way of example, in accordance with a set of embodiments, a method of storing data on a data storage device comprises providing a non-volatile data storage device comprising a plurality of allocation units for storing data. In some embodiments, the data storage device employs an indirect addressing scheme to address the plurality of allocation units. This exemplary method, then, includes receiving a request to store a first data chunk on the storage device and/or allocating a first set of allocation units in which to store the first data chunk. In an aspect of particular embodiments, a Buddy-Tree algorithm is used to allocate this first set of allocation units. The first data chunk, then, might be stored in this first set of allocation units.

This exemplary method further comprises receiving a request to store a second data chunk on the data storage device and/or identifying (within the plurality of allocation units) a second set of allocation units sufficient to store the second data chunk. In some cases, the method includes determining that the second set of allocation units comprises at least a portion of the first set of allocation units. In such cases, a third set of allocation units might be identified within the plurality of allocation units. This third set of allocation units, in an aspect, is sufficient to store the first data chunk. In another aspect, the third set of allocation units might be exclusive of the second set of allocation units. In other words, the third set of allocation units has no allocation units in common with the second set of allocation units.

The third set of allocation units might then be allocated (again, perhaps with a Buddy-Tree algorithm) to hold the first data chunk, such that the first data chunk can be relocated to the third set of allocation units. In an aspect, this frees the second set of allocation units (and, more specifically, those allocation units in the second set that were also part of the first set of allocation units) for storing the second data chunk). This second set of allocation units, then, can be allocated to hold the second data chunk, and the method thus might include storing the second data chunk in the second set of allocation units.

Another set of embodiments provides methods of storing data chunks of varying sizes on a data storage device (that is to say, it can store data chunks of different sizes, not that any particular data chunk necessarily has a varying size). An exemplary method comprises receiving a request to store, on the data storage device, a first data chunk having a first size and identifying a first set of allocation units, on the data storage device, to allocate for storing the first data chunk. In some embodiments, the method further comprises determining that a second data chunk, which has a second size, exists at a subset of one or more of the allocation units within the first set of allocation units. A second set of allocation units, comprising at least one allocation unit, might then be identified for storing the second data chunk. The second set of allocation units can be allocated for the second data chunk, which might free the first set of allocation units. The first set of allocation units, then, can be allocated for storing the first data chunk.

Another exemplary method in accordance with some embodiments is a method of providing reduced fragmentation in a data storage device. This exemplary method might comprise providing a data storage device having first data stored thereon and receiving a request to store second data on the data storage device. After receiving the request to store the second data, at least some of the first data might be relocated on the data storage device, based, perhaps, on a determination that there is insufficient contiguous space on the data storage device to store the second data. The second data then might be stored on the data storage device.

Yet another set of embodiments provides systems for reducing fragmentation of a computer memory device and/or for allocating space on a computer memory device. In some exemplary embodiment, the system comprises one or more processors, along with a set of instructions executable by the processor(s) to perform methods of the invention. In particular embodiments, the system might further comprise a memory device in communication with the processor(s). The memory device might comprise, merely by way of example, one or more hard disks, disk arrays, random access memory devices, and/or the like. The system might further comprise a computer readable medium that includes instructions for performing various methods of the invention.

Yet another set of embodiments provides software programs, including without limitation software programs for reducing fragmentation of a computer memory device and/or for allocating space on a computer memory device. An exemplary software program might be embodied on a computer readable medium and/or might comprise a set of instruction that are executable by one or more computers to perform methods of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components. It should be noted that the drawings, and accompanying description, are intended to illustrate a few exemplary embodiments but are not intended to be comprehensive or limiting.

DETAILED DESCRIPTION

1. Overview

One set of embodiments provides tools (such as systems, methods, software products and/or the like) storing data on a data storage device, including tools that can reduce and/or eliminate fragmentation on such storage devices. As used herein, the term "data storage device" means any device that can be used to store data in (and/or in conjunction with) a computer system. Examples of data storage devices include, without limitation, hard disk drives, disk drive systems (such as redundant array of independent disk ("RAID") systems, groups of disks, etc.), flash memory and/or the like. Some exemplary storage systems that can be used with embodiments of the invention are described in U.S. Pat. Nos. 6,405,204 and 6,530,035. both of which are hereby incorporated herein by reference. For ease of description, this disclosure often uses the term "disk" to refer to a data storage device, but it should be understood that such descriptions can apply to any type of data storage device.

In an aspect, some embodiments of the invention advantageously employ an allocation scheme that employs a Buddy-Tree algorithm to allocate allocation units for storing data chunks. Paul R Wilson et al., "Dynamic Storage Allocation: A Survey and Critical Review," (published in *Proc. 1995 Int'l Workshop on Memory Management*, Kinross, Scotland, UK, Sep. 27-29, 1995), the disclosure of which is incorporated herein by reference, describes Buddy-Tree algorithms (sometimes referred to as "buddy algorithms" or "buddy systems"), as well as other allocation schemes, in the context of dynamic memory ("heap") allocation.

One skilled in the art will appreciate that allocation schemes for working memory are distinct from allocation schemes for nonvolatile storage devices, because the needs of each type of device are different. On the one hand, working memory is quite dynamic, in that the contents of the memory device change frequently, and speed of allocation is paramount. On the other hand, nonvolatile data storage devices are used to store data that is relatively more static, in that the data changes much less frequently. Moreover, nonvolatile storage devices (especially magnetic storage devices), by their nature, are generally slower than dynamic memory devices. Accordingly, allocation of working memory generally presents a different problem than allocation of nonvolatile storage, because most working memory systems do not provide any level of indirection (instead, they provide direct memory addressing). Hence, while Buddy-Tree algorithms are known in the context of working memory allocation systems, they generally are not employed for allocation of nonvolatile storage.

Embodiments of the invention, however, employ the Buddy-Tree algorithm to reduce fragmentation nonvolatile storage devices, such as in hard disk drives and other nonvolatile data storage devices. Advantageously, many such data storage devices (including, for example, disk storage systems) employ an indirect addressing scheme. In other words, such systems maintain a level of indirection between the physical addresses of allocation units on the storage media and the pointers given to software programs (such as applications, etc.) to access those allocation units (and/or, more specifically, the data stored in those allocation units.) In such systems, and others, we have discovered that it is possible to dramatically reduce, and in some cases, substantially eliminate fragmentation with a Buddy-Tree system of allocation.

The Buddy-Tree algorithm used in certain embodiments of the invention can be used for fast allocation and deallocation of space (in the form of sets of allocation units, which can be thought of as "segments" of free space) to store variable-sized data. In an aspect, the algorithm allocates space in segments of $k^n$ allocation units, where n=0, 1 .... Space for a data chunk of size $k^n$ generally will be allocated only at an address aligned at a $k^n$ boundary. In another aspect, to minimize fragmentation space for, k adjacent, properly aligned chunks of size $k^{n-1}$ can be coalesced into one free segment with a collective size of $k^n$ allocation units. Conversely, one free segment having a size $k^n$ allocation units can be split into k segments, each set having a collective size of $k^{n-1}$ allocation units, as required.

Hence, if a request is received to store data for which there is insufficient free space, existing data can be relocated to other sets of free allocation units to allow coalescing of adjacent smaller sets of allocation units to satisfy the request to store the new data. Of course, it may be necessary to free space to hold the relocated data chunk, and this process can be used iteratively as many times as necessary. Hence, a first relocation, at least theoretically, might trigger a long series of secondary chunk relocations, which might threaten to render prohibitive the cost of freeing the space. However, we have discovered that, due to the properties of the Buddy-Tree allocation algorithm, the chain of such secondary relocations is limited and acceptable in most, if not all, practical cases.

2. Analytical Model

To illustrate our discovery, we present the following analysis. Let $a_n$ be the number of bytes that need to be moved (in the worst case) to allocate space for a data chunk of size $k^n$. It follows that $$a_0 = 0 \quad (1)$$

since no data would need to be moved to allocate space for a chunk of size one allocation unit, and $$k^0 = 1 \quad (2)$$

for all non-zero, finite values of k.

Further, we find that $$a_n = (k-1)(k^{n-1} + a_{n-1}) + (k-1)(k^{n-2} + a_{n-2}) + \ldots + (k-1)(k^0 + a_0) \quad (3)$$

because, to make space for a data chunk of size $k^n$, we might need to relocate, at most, k-1 chunks of size $k^{n-1}$, k-1 chunks of size $k^{n-2}$, etc. In a worst case scenario, to relocate a chunk, space for that chunk must first be freed. Hence, the recursion in Eq. (3). This equation can be restated as $$a_n = (k-1) \sum_{i=0}^{n-1} (k^i + a_i) \quad (4)$$

$$a_n = k^n - 1 + (k-1) \sum_{i=0}^{n-1} a_i \quad (5)$$

By setting $$s_n = \sum_{i=0}^{n} a_i,$$

we can derive $$a_n = k^n - 1 + (k-1) s_{n-1} \quad (6)$$

and it follows that $$a_{n+1} = k^{n+1} - 1 + (k-1) s_n \quad (7)$$

$$a_{n+1} = k^{n+1} - 1 + (k-1)(s_{n-1} + a_n) \quad (8)$$

Substituting Eq. (6) into Eq. (8), we find that $$a_{n+1} = (k-1)k^n + k a_n \quad (9)$$

Because $a_0 = 0$, we can solve Eq. (9) for $a_n$ thusly:

$$a_n = n(k-1)k^{n-1} \quad (10)$$

Hence, if k=4, then $a_1 = 3$, $a_2 = 24$, $a_3 = 144$ and so on. It can be seen, then, that the cost of relocation (expressed as $a_n$) grows exponentially with n, so does the size of each data chunk, which is expressed as $k^n$. Therefore, the cost of relocation normalized to the size of the chunk is n(k-1)/k<n. Consequently, to free space for a data chunk of size s, the Buddy-Tree algorithm will, at an upper bound, relocate space proportional to the logarithm of the chunk's size s.

Advantageously, the Buddy-Tree algorithm's address alignment (described above) provides substantial benefits over some other types of allocation algorithms. With those algorithms, it may end up being the case that, in order to free space for a chunk of 4 allocation units, the system might have to relocate a data chunk of 64 allocation units that partially overlaps with the desired space for the data chunk of size 4 allocation units (even if only by 1 allocation unit). In contrast, the Buddy-Tree algorithm limits the required relocation to iteratively smaller chunks, which allows us to derive the bound expressed by Eq. (10).

3. Exemplary Embodiments

The following exemplary embodiments illustrate how the principles described above can be implemented in a computer system to allocate space for data, and to store that data, on a disk. Merely by way of example, FIG. 1 illustrates a system 100 that can be used to store data. The system comprises a computer 105, an example of which is described below in more detail with respect to FIG. 3. In some cases, the computer 105 will comprise instructions that are executable by the computer 105 (and/or a processor therein) to perform methods of the invention. In an exemplary case, these instructions might be embodied by a storage manager, such as Automatic Storage Management™ ("ASM™") services, available from Oracle Corp. as part of the Oracle 10g™ product. In other cases, the instructions might be embodied by a computer operating system, or otherwise by hardware, software and/or firmware (for example, as part of a RAID software program, disk controller, etc.).

Figure 1A:
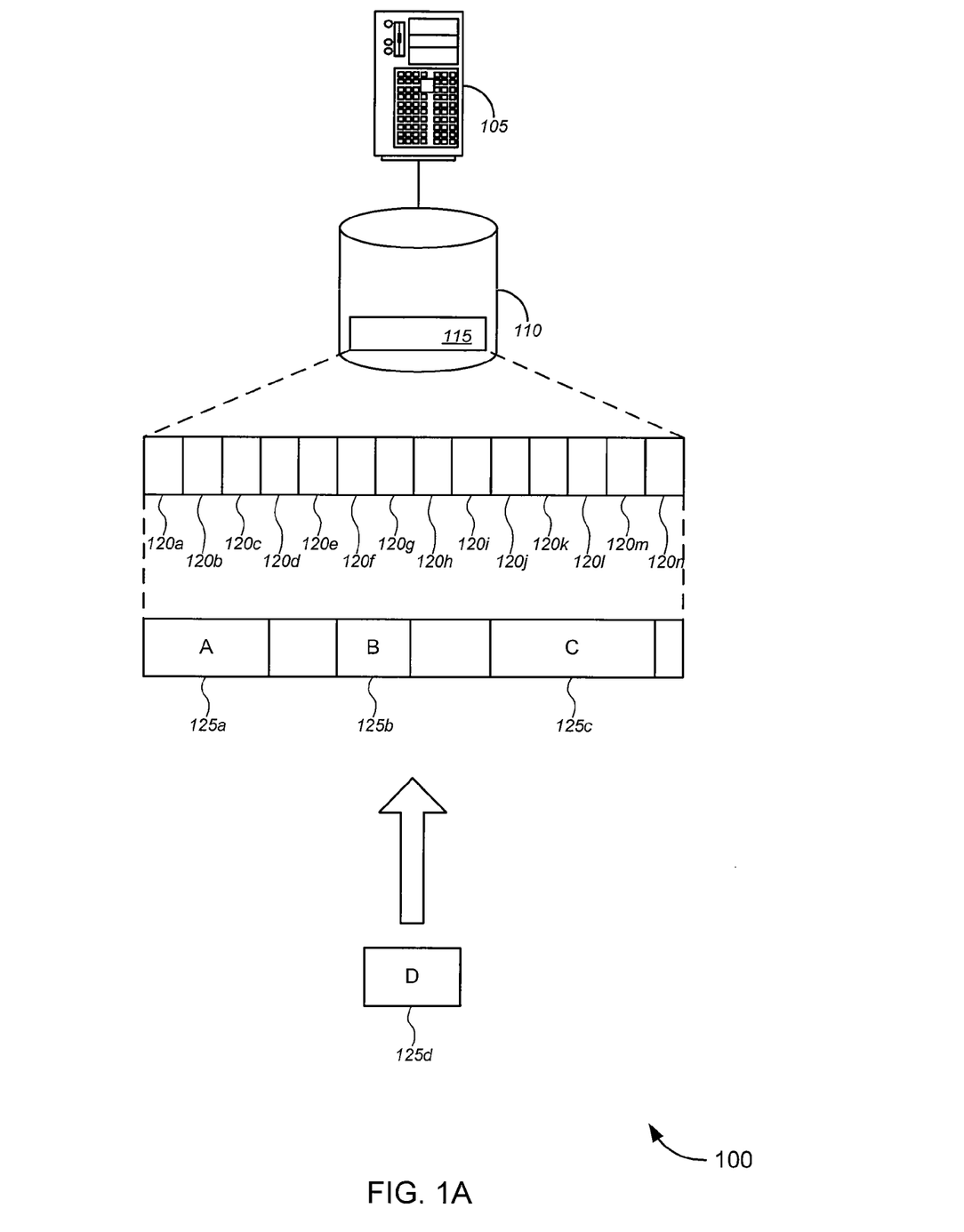
FIGS. 1A-1C illustrate a system for storing data, in accordance with a set of embodiments.

Some embodiments also include one or more data storage devices, such as drive 110 depicted on FIG. 1A. A drive 110 might be incorporated within the computer 105 and/or might be physically separate but in communication with the computer 105. The drive 110 comprises a storage medium 115 (such as magnetic platters, etc.) on which data is stored. In the illustrated embodiments, the storage medium 115 is divided logically into a plurality of allocation units 120, each of which represents the smallest unit the storage medium 115 can be divided into for storing chunks of data.

As illustrated by FIG. 1A, there are three chunks 125 of data stored on the disk 110. Each of these data chunks 125 represent a set of data, and or a portion thereof, and each might correspond to any type of data, such as database data, a file, and/or the like. (Typical files might include application programs, operating system files, data files, such as text files and/or binary files—e.g., image files, word processing documents, etc.—and/or the like.) In an aspect, each of the data chunks 125 is stored in a set of one or more allocation units, depending, of course, on the size of the data chunk. Merely by way of example, data chunk A 125a is stored in allocation units 120a-120d, while data chunk B 125b is stored in allocation units 120f-g, and data chunk C 125c is stored in allocation units 120j-n. (It should be noted that, even if a data chunk does not occupy an entire allocation unit, the unused portion of the allocation unit, by its nature, is not available for storing other data.)

Assume that a request is received (from an application program, from the operating system, etc.) to store another data chunk 125d, and that there are not sufficient free allocation units to store the additional data chunk 125d. Traditionally, the system would report that there exists insufficient space to satisfy the request. This is a result of fragmentation in the media 115. For example, allocation units 120h-i are free, as is allocation unit 120e, and collectively, they would provide sufficient space to store the additional data chunk 125d, except that they are not contiguous.

To free the needed space for storing the additional data chunk 125d, one or more of the stored data chunks 125a-c can be relocated. As noted above, this relocation operation traditionally could prove to be quite costly from a resource-utilization performance, since there might be no upper limit on the cascading number of relocations required. (At this point, it should be noted that FIG. 1A, for ease of description, provides a dramatically over-simplified illustration of allocation units 120 and data chunks 125. In a typical environment, there might be thousands or millions of allocation units and data chunks, and a relocation operation might require the relocation of a substantial portion of these data chunks, which is what happens in a traditional defragmentation operation. In this situation, the disk 110 effectively would be out of service during the operation, which could span several minutes, hours or even days.)

Figure 1B:
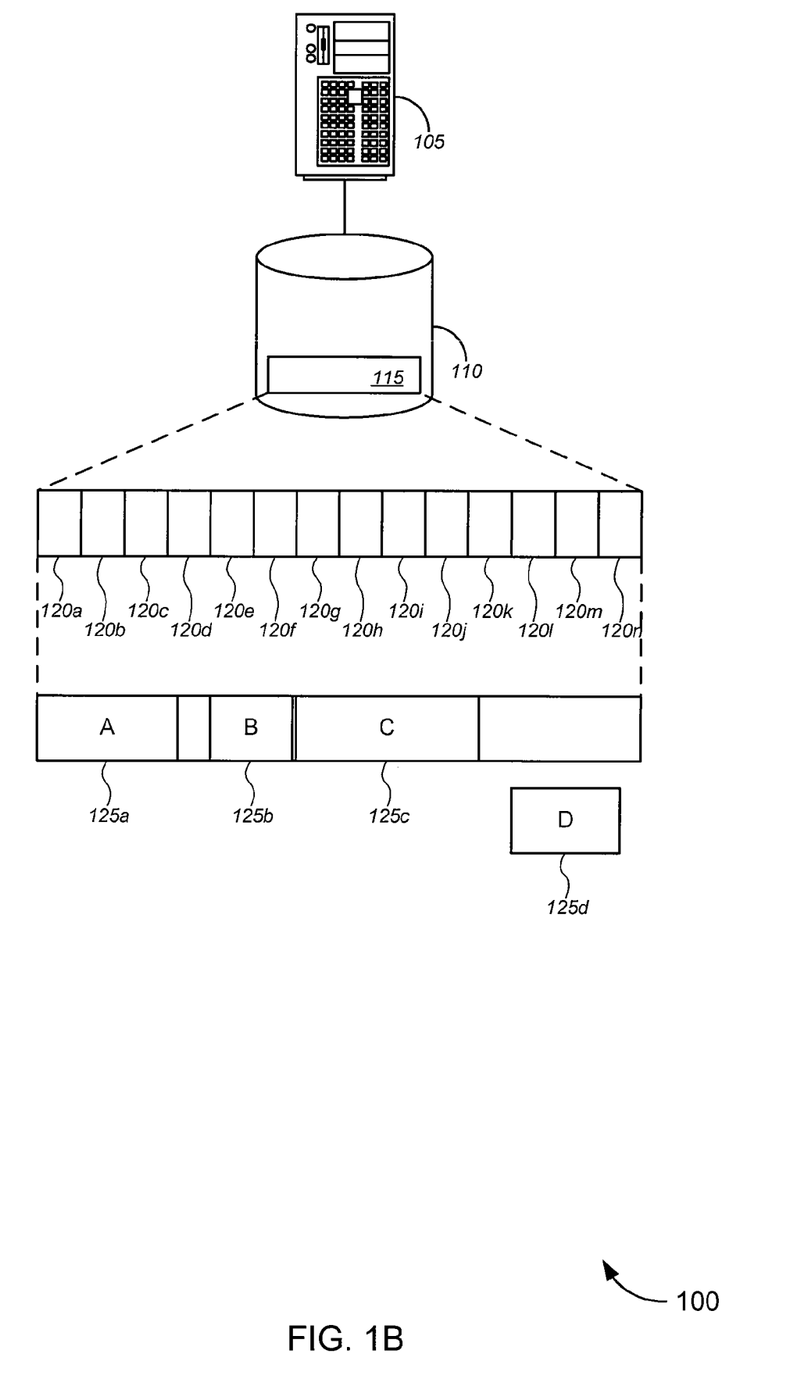
Figure 1C:
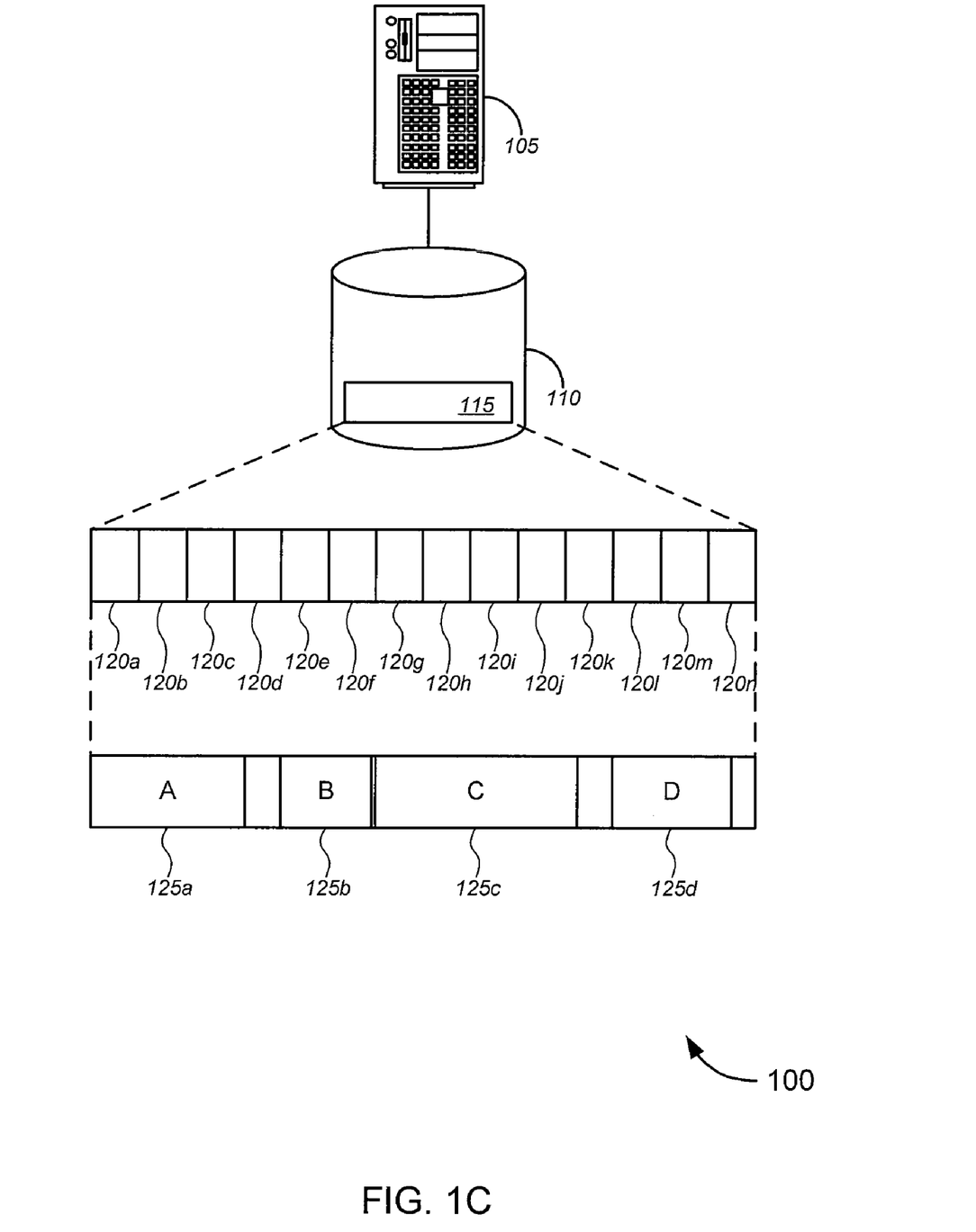

In an aspect of some embodiments of the invention, however, as noted above, the number of data chunks that need to be relocated is bounded. Hence, in some embodiments, one or more of the data chunks 125a-c can be relocated to free space for the additional data chunk 125d. Merely by way of example, as illustrated by FIG. 1B, data chunk C 125c can be relocated to allocation units 120g-j, which would provide sufficient space to allocate for the additional data chunk 125d. This, however, first requires the relocation of data chunk B 125b. Accordingly, allocation units 120e-f can be coalesced and allocated to store data chunk B 125b, and that chunk 125b can be relocated to allocation units 120e-f. Similarly, allocation units 120g-k can be coalesced and allocated for storing data chunk C 125c. This frees allocation units 120l-n. As illustrated by FIG. 1C, then, allocation units 120l-n can be allocated for the additional data chunk 125d, and that chunk 125d can be stored in those allocation units 120l-n.

As illustrated by FIGS. 1A-C, various embodiments of the invention, then, effectively can reduce, and perhaps substantially eliminate, fragmentation of storage space on a disk. By relocating data chunks on demand, the utilization of the media can be maximized, without having to bear the substantial cost of wholesale relocation (defragmentation). This is but one of the advantages of some embodiments of the invention.

Figure 2:
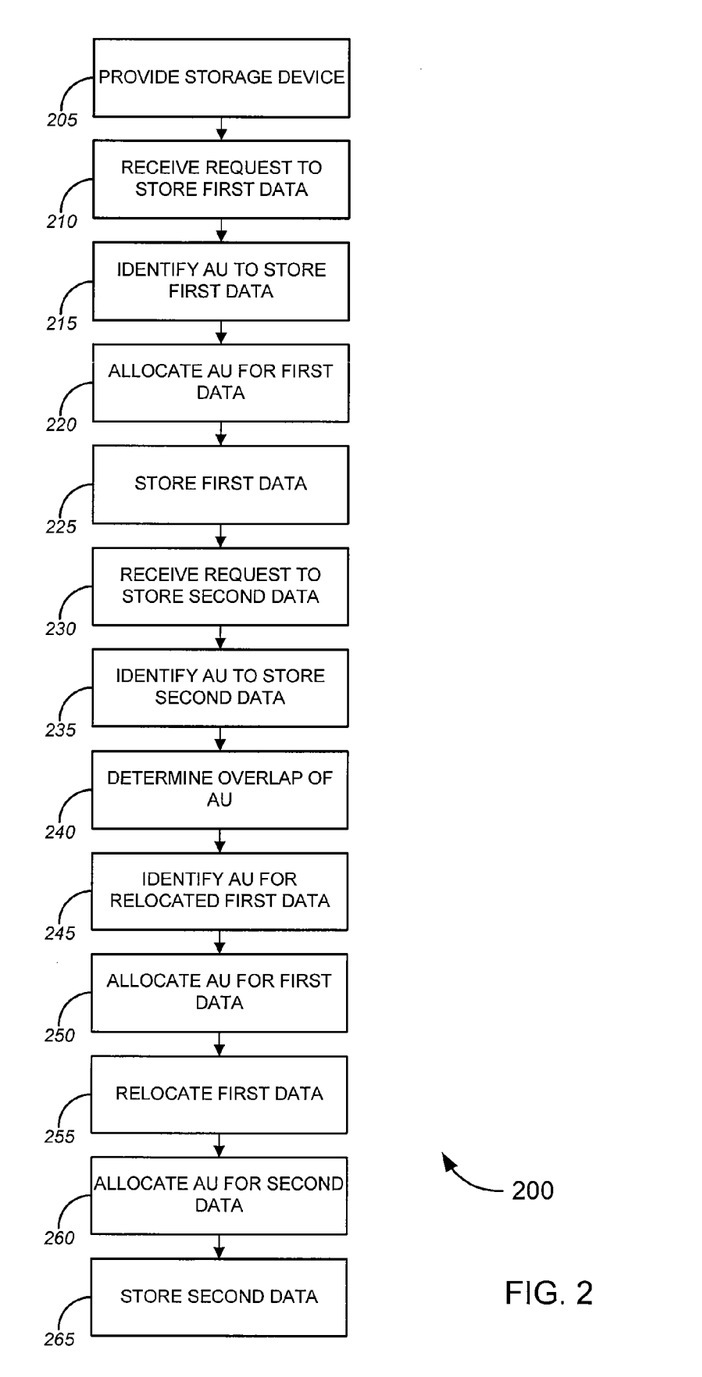
FIGS. 2 and 3 illustrate methods of storing data and/or reducing fragmentation in a data storage device, in accordance with embodiments of the invention.
Figure 3:
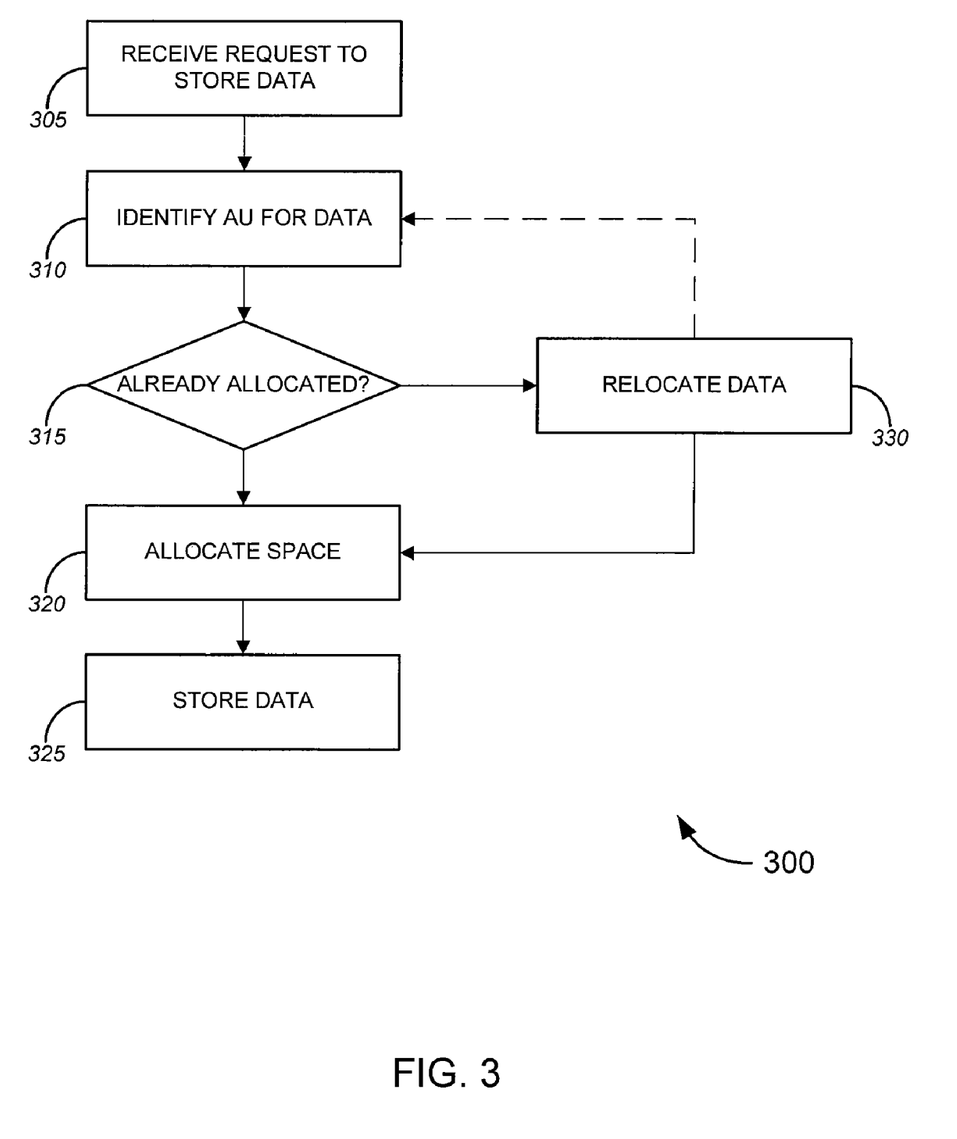

FIG. 2 illustrates a method 200 that can be used to store data on a disk and/or to reduce fragmentation of a disk. As noted above, the method 200, as well as the method 300 described below, and other methods of the invention, might be implemented by a set of instructions, which could be provided on a computer readable medium, and/or might be implemented as part of a system, such as the systems described elsewhere herein.

The method 200 comprises providing a data storage device (block 205), which can be any of the data storage devices described herein. In some embodiments providing a data storage device comprises selling, configuring and/or operating a computer system of which the data storage device is a part and/or with which the data storage device is in communication. In a set of embodiments, the storage device is a non-volatile data storage device (i.e., provides non-volatile storage). Examples of such devices are disk drives, disk drive systems, flash memory, etc. This is in contrast with volatile storage devices, such as the RAM devices typically used for providing working memory (heap memory, stack memory, etc.) for a computer system. The data storage device (or, more particularly, in many cases, the storage media within the data storage device) might comprise a plurality of allocation units, which are used to store data (which, in some embodiments, are divided into data chunks, as described above). In a set of embodiments, the storage device might employ an indirect addressing scheme (as described above) to address the plurality of allocation units.

The method 200 further comprises receiving a request to store a first chunk of data (block 210). The request might be received at the storage device itself. Alternatively, the request might be received at a storage management application, at an operating system, etc. It is immaterial to the scope of the invention where the request is received, and one skilled in the art will appreciate, based on the disclosure herein, that depending on the configuration of the storage system, either the storage hardware itself and/or an intermediate layer of software might provide the services described herein. Merely by way of example, a storage manager might have direct access to the hardware and/or might provide an indirect addressing mechanism to facilitate the use of the hardware by other applications.

In accordance with the method 200, a set of allocation units are identified to store the first data chunk (block 215). Generally the identification of a set of allocation units will comprise analyzing the request (and/or the first data chunk itself) to determine how many allocation units will be required to store the data chunk, and searching an allocation table (or other resource) to determine whether there are sufficient (contiguous) free allocation units to store the first data chunk. In this exemplary embodiment, it is assumed that there are sufficient (contiguous) free allocation units to satisfy the request, and those allocation units are allocated for storing the first data chunk (block 220). In an aspect of some embodiments, a Buddy-Tree algorithm is used to allocate the identified allocation units. The first data chunk, then, is stored in these allocation units (block 225).

At block 230, the system receives a request to store a second data chunk. A second set of allocation units to store this second data chunk is identified (block 235), much in the same manner as discussed above. Assume, in this example, however, that the system determines that there are insufficient free contiguous allocation units to store the second data chunk. In other words, the system determines that the second set of allocation units overlaps with the first set of allocation units, in which the first data chunk is stored (i.e., that the second set of allocation units comprises at least a portion of the first set of allocation units and/or that data already exists at some subset of the second set of allocation units) (block 240). For example, returning briefly to FIG. 1A, when the system attempts to identify a set of allocation units to store data chunk D 125d, it might identify allocation units 120l-n as being sufficient to store data chunk D 125d, but then it would determine that at least some of those allocation units already have been allocated to store data chunk C 125c.

Accordingly, in this situation, the first data chunk will need to be relocated, so a third set of allocation units sufficient to store that first set of data is identified (block 245) and is allocated for storing the first data chunk (block 250), perhaps using a Buddy-Tree algorithm. Generally, the third set of allocation units will be exclusive of the second set of allocation units (i.e., that there will be no overlap—or common allocation units—between the third set of allocation units and the second set of allocation units); otherwise, the relocation of the first data chunk would not be effective. The first data chunk is then relocated to (i.e., stored in) this third set of allocation units (block 255), which frees the second set of allocation units to hold the second data chunk. The second set of allocation units then can be allocated (or, more specifically, in some cases, reallocated) for the second data chunk (block 260), and the second data chunk is stored in the second set of allocation units (block 265).

As noted above, embodiments of the invention can be used to store (and/or allocate space for) variable-sized data chunks. In other words, the first data chunk might have a first size, and the second data chunk might have a second size. Moreover, one skilled in the art will note, based on the disclosure herein, that the relocation of the first data chunk and/or the reallocation of the second set of allocation units might comprise several procedures. Merely by way of example, in some cases, when relocating the first data chunk and/or reallocating the second set of allocation units, the first set of allocation units (which originally held the first data chunk) might be deallocated prior to reallocating at least a portion of those allocation units as part of the second set of allocation units. Further, allocating a set of allocation units might implicitly include either splitting a set of allocation units into smaller chunks and/or coalescing several allocation units into a single, larger, chunk for holding a larger data chunk.

It should also be appreciated that the procedures of determining an overlap of allocation units, relocating data chunks, and storing new data chunks in at least a portion of the previously allocated allocation units (collectively comprising, inter alia, some or all of blocks 245-265) might need to be repeated iteratively, since, as noted above, relocating one data chunk might require the relocation of additional data chunks as well.

Hence, FIG. 3 provides a more generalized depiction of a method 300 for storing data and/or reducing fragmentation. This method 300 comprises receiving a request to store a data chunk (block 305) and identifying a set of allocation units sufficient to store the data chunk (block 310). Often, if not always, the set of allocation units will need to be contiguous, and ideally there will be sufficient contiguous free (unallocated) allocation units to satisfy the request. In many cases, however, there will not be sufficient contiguous free allocation units. Hence, at block 315, the system determines whether at least a portion of the identified allocation units are already allocated to store other data (block 315). If not, the allocation units are allocated to store the requested data chunk (block 320) and the data chunk is stored in those allocation units (block 325).

On the other hand, if those allocation units already have been allocated to store other data, that other data must be relocated (block 330). At this point, the process becomes recursive, as a set of allocation units are identified to store the data to be relocated (block 310). Once again, a determination must be made of whether those allocation units are already allocated to store yet other data (block 315). If not, the allocation units can be allocated (block 320) and the data can be relocated (stored) (block 325). If those allocation units are already allocated, however, the process iterates, and the data in those allocation units must be relocated (block 330).

As noted above, this process can recurse as necessary, but the number of recursions required generally is limited when a Buddy-Tree algorithm is used to allocate the allocation units. Hence, this method 300 generally can be performed without incurring prohibitive cost (in terms of time, resource utilization, etc.). Moreover, as noted above, this method of storing data generally will result in a lower degree of fragmentation than other allocation and storage procedures, and in fact can substantially eliminate fragmentation in a data storage device.

Figure 4:
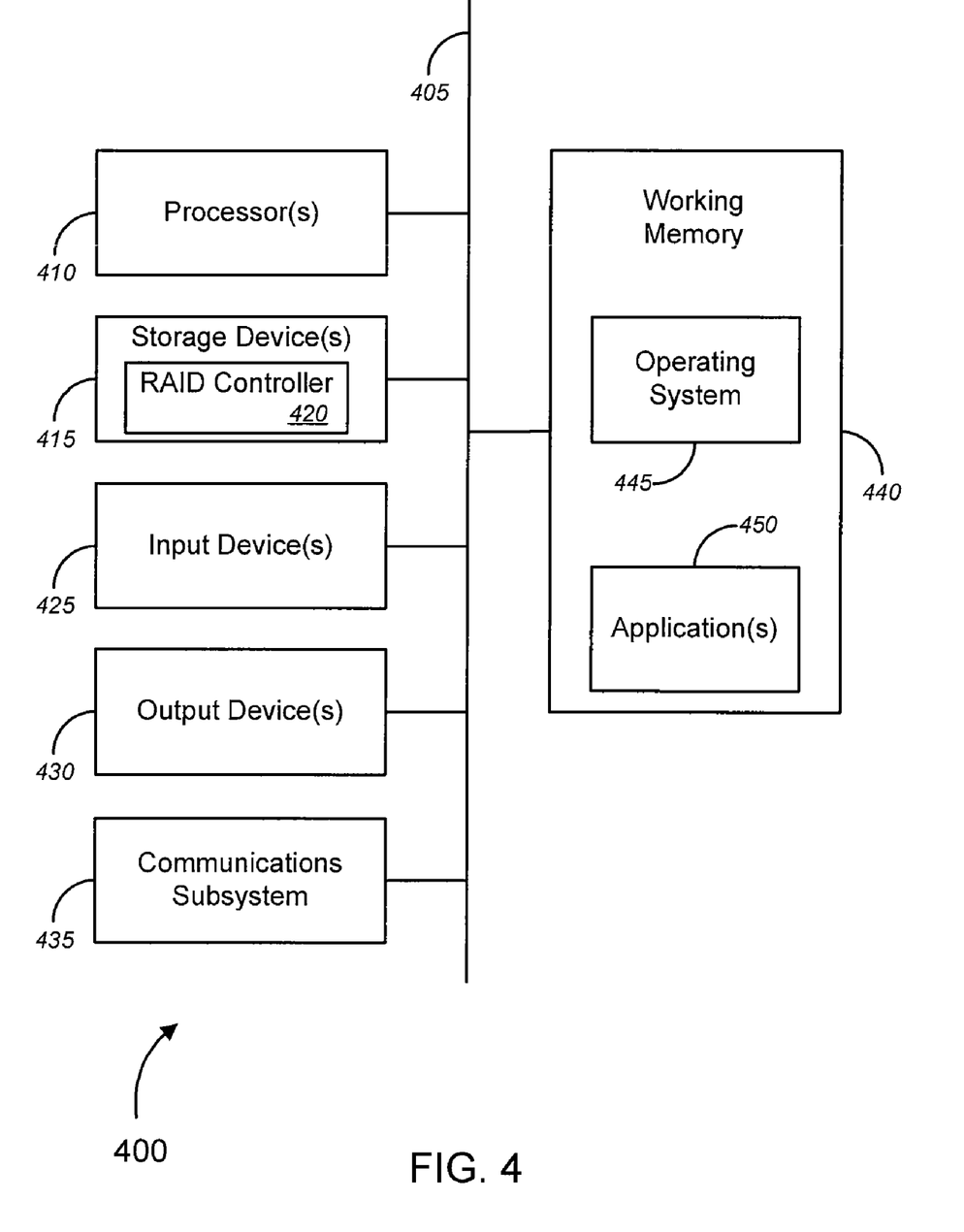
FIG. 4 is a generalized schematic diagram illustrating a computer system that can be used in accordance with various embodiments of the invention.

FIG. 4 provides a generalized schematic illustration of one embodiment of a computer system 400 that can perform the methods of the invention and/or the functions of computer, such as the computers described above. FIG. 4 is meant only to provide a generalized illustration of various components, any of which may be utilized as appropriate. The computer system 400 can include hardware components that can be coupled electrically via a bus 405, including one or more processors 410. In addition, one or more data storage devices 415 might be coupled to the bus.

Such data storage devices 415 can include without limitation a disk drive, an optical storage device, solid-state storage device such as a random access memory ("RAM") and/or a read-only memory ("ROM"), which can be programmable, flash-updateable and/or the like (and which can function as a data store). In some embodiments, the data storage devices 415 might comprise a storage system, including one or more disk groups that can be managed by storage management software, such as ASM, described above. (The hard disks in such a system need not be physically enclosed within the computer system 400, but instead might be in communication with, and/or controlled by, the computer system 400). In some cases, the data storage device(s) 415 might include one or more RAID systems, and the computer system 400 might include a RAID controller 420 that is operable to configure and/or manage such RAID systems, for instance, to implement methods of the invention.

Also in communication with the bus 405 can be one or more input devices 425, which can include without limitation a mouse, a keyboard and/or the like; one or more output devices 430, which can include without limitation a display device, a printer and/or the like; and a communications subsystem 435, which can include without limitation a modem, a network card (wireless or wired), an infra-red communication device, and/or the like.

The computer system 400 also can comprise software elements, shown as being currently located within a working memory 440 (but which could also more permanently be stored on one or more of the data storage devices 415 and/or other computer readable media). The software elements generally will include one or more sets of instructions that are executable by the computer system 405. Specifically, the software elements can including, without limitation, an operating system 440 and/or other code 445, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Figure 5:
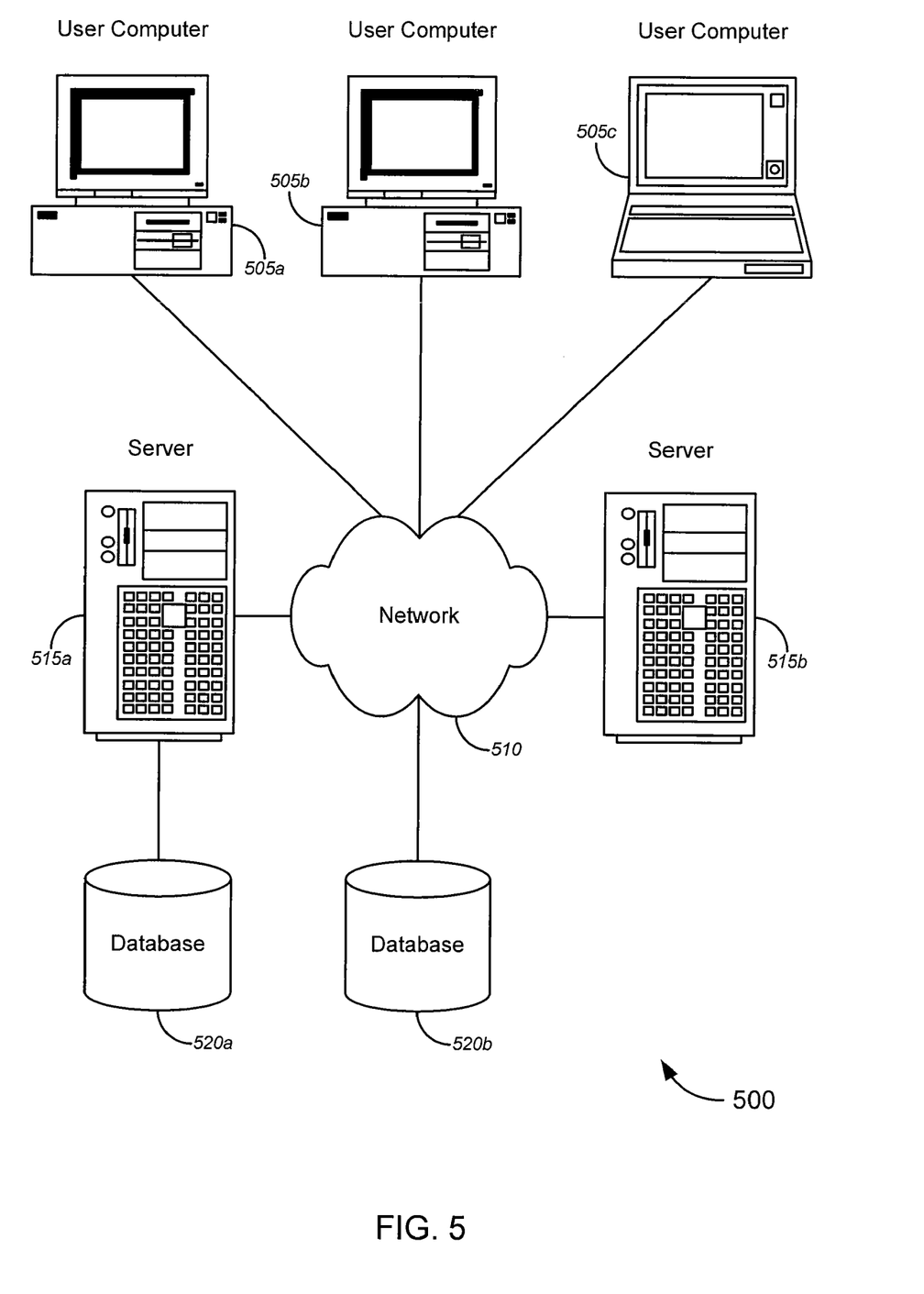
FIG. 5 is a block diagram of a networked computer system that can be used in accordance with various embodiments of the invention.

As noted above, a set of embodiments comprises systems storing data. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant, capable of communicating via a network (e.g., the network 510 described below) and/or displaying and navigating web pages or other types of electronic documents. Although the exemplary system 500 is shown with three user computers, any number of user computers can be supported.

Certain embodiments of the invention operate in a networked environment, which can include a network 510. The network 510 can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system including without limitation any of those discussed above, as well as any commercially-available server operating systems. Each of the servers 515 may also be running one or more applications, which can be configured to provide services to one or more clients 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one ore more file and or/application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 505 and/or another server 515. In some embodiments, an application server can create web pages dynamically for displaying information about disk groups and/or for initiating and/or performing disk group configuration and/or repair operations. Data provided by an application server may be formatted as web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server.

In accordance with further embodiments, one or more servers 515 can function as a file server and/or can include one or more of the files necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. The SAN might be implemented as a disk group in accordance with embodiments of the invention. (Likewise, any necessary files for performing the functions attributed to the computers 505, 515 can be stored locally on the respective computer and/or remotely, as appropriate.) In one set of embodiments, the database 535 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software and/or ASM™ software, which can be used to provide advanced allocation and storage services, as described herein.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Further, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for storing data on a data storage device, the method comprising:
    providing a non-volatile data storage device comprising a plurality of allocation units for storing data, wherein the non-volatile data storage device employs an indirect addressing scheme to address the plurality of allocation units;
    receiving a request to store a first data chunk on the non-volatile data storage device;
    allocating, with a Buddy-Tree algorithm, a first set of allocation units in which to store the first data chunk;
    storing the first data chunk in the first set of allocation units;
    receiving a request to store a second data chunk on the non-volatile data storage device;
    identifying, within the plurality of allocation units, a second set of allocation units sufficient to store the second data chunk;
    determining that the second set of allocation units comprises at least a portion of the first set of allocation units;
    identifying, within the plurality of allocation units, a third set of allocation units sufficient to store the first data chunk, wherein the third set of allocation units is exclusive of the second set of allocation units;
    allocating, with a Buddy-Tree algorithm, the third set of allocation units to hold the first data chunk;
    relocating the first data chunk to the third set of allocation units;
    allocating, with a Buddy-Tree algorithm, the second set of allocation units to hold the second data chunk; and
    storing the second data chunk in the second set of allocation units.

2. The method as recited by claim 1, wherein the first data chunk has a first size, and wherein the second data chunk has a second size.

3. The method as recited in claim 2, wherein the first size and the second size are the same size.

4. The method as recited in claim 2, further comprising de-allocating the at least a portion of the first set of allocation units prior to allocating the second set of allocation units for storing the second data chunk.

5. The method as recited in claim 1, wherein the non-volatile data storage device comprises at least one hard disk drive.

6. A system, comprising:
    a processor;
    a data storage device in communication with the processor and configured to store a plurality of data chunks; and
    a computer readable medium comprising a set of instructions executable by the processor, the set of instructions comprising:
        instructions to receive a request to store on the data storage device a first data chunk having a first size;
        instructions to allocate, with a Buddy-Tree algorithm a first set of allocation units, on the data storage device, to allocate for storing the first data chunk;
        instructions to store the first data chunk in the first set of allocation units;
        instructions to receive a request to store on the data storage device a second data chunk having a second size;
        instructions to identify within the plurality of allocation units, a second set of allocation units sufficient to store the second data chunk;
        instructions to determine that the second set of allocation units comprises at least a portion of the first set of allocation units;
        instructions to identify a third set of allocation units on the data storage device, sufficient to store the first data chunk, wherein the third set of allocation units is exclusive of the second set of allocation units;
        instructions to allocate with a Buddy-Tree algorithm the third set of allocation units for storing the first data chunk;
        instructions to relocate the first data chunk to the third set of allocation units;
        instructions to allocate with a Buddy-Tree algorithm the second set of allocation units for storing the second data chunk; and
        instructions to store the second data chunk in the second set of allocation units.

7. The system as recited by claim 6, wherein a first device comprises the processor and a second device comprises the data storage device.

8. The system as recited by claim 6, wherein the data storage device comprises at least one hard disk drive.

9. The system as recited by claim 6, wherein the data storage device comprises an array of hard disk drives.

10. The system as recited by claim 6, wherein the data storage device comprises a flash memory device.

11. The system as recited by claim 6, wherein the set of instructions is incorporated within a storage management application.

12. A computer program, embodied on a non-transitory computer readable medium, the computer program comprising a set of instructions executable by one or more computers, the set of instructions comprising:

- instructions to receive a request to store on the data storage device a first data chunk having a first size;
- instructions to allocate, with a Buddy-Tree algorithm a first set of allocation units, on the data storage device, to allocate for storing the first data chunk;
- instructions to store the first data chunk in the first set of allocation units;
- instructions to receive a request to store on the data storage device a second data chunk having a second size;
- instructions to identify within the plurality of allocation units, a second set of allocation units sufficient to store the second data chunk;
- instructions to determine that the second set of allocation units comprises at least a portion of the first set of allocation units;
- instructions to identify a third set of allocation units on the data storage device, sufficient to store the first data chunk, wherein the third set of allocation units is exclusive of the second set of allocation units;
- instructions to allocate with a Buddy-Tree algorithm the third set of allocation units for storing the first data chunk;
- instructions to relocate the first data chunk to the third set of allocation units;
- instructions to allocate with a Buddy-Tree algorithm the second set of allocation units for storing the second data chunk; and
- instructions to store the second data chunk in the second set of allocation units.

13. A system, comprising:

- means for receiving a request to store on a data storage device a first data chunk having a first size;
- means for allocating, with a Buddy-Tree algorithm a first set of allocation units, on the data storage device, to allocate for storing the first data chunk;
- means for storing the first data chunk in the first set of allocation units;
- means for receiving a request to store on the data storage device a second data chunk having a second size;
- means for identifying within the plurality of allocation units, a second set of allocation units sufficient to store the second data chunk;
- means for determining that the second set of allocation units comprises at least a portion of the first set of allocation units;
- means for identifying a third set of allocation units on the data storage device, sufficient to store the first data chunk, wherein the third set of allocation units is exclusive of the second set of allocation units;
- means for allocating with a Buddy-Tree algorithm the third set of allocation units for storing the first data chunk;
- means for relocating the first data chunk to the third set of allocation units;
- means for allocating with a Buddy-Tree algorithm the second set of allocation units for storing the second data chunk; and
- means for storing the second data chunk in the second set of allocation units.

14. The method as recited by claim 13, wherein the first data has a first size, and wherein the second data has a second size.

* * * * *

UNITED STATES PATENT AND TRADEMARK OFFICE
CERTIFICATE OF CORRECTION

| | |
|---|---|
| PATENT NO. | : 8,140,806 B2 |
| APPLICATION NO. | : 11/694445 |
| DATED | : March 20, 2012 |
| INVENTOR(S) | : Vingralek et al. |

It is certified that error appears in the above-identified patent and that said Letters Patent is hereby corrected as shown below:

In column 1, line 54, delete "As" and insert -- As noted --, therefor.

In column 5, line 8, After "fragmentation" insert -- in --.

In column 12, line 14, delete "ore" and insert -- or --, therefor.

Signed and Sealed this
Fifth Day of June, 2012

David J. Kappos
*Director of the United States Patent and Trademark Office*